(12) United States Patent
Hayashi et al.

(10) Patent No.: US 10,995,641 B2
(45) Date of Patent: May 4, 2021

(54) EXHAUST GAS PURIFICATION APPARATUS FOR INTERNAL COMBUSTION ENGINE

(71) Applicant: TOYOTA JIDOSHA KABUSHIKI KAISHA, Toyota (JP)

(72) Inventors: Daisuke Hayashi, Mishima (JP); Kouseki Sugiyama, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/590,639

(22) Filed: Oct. 2, 2019

(65) Prior Publication Data

US 2020/0116058 A1    Apr. 16, 2020

(30) Foreign Application Priority Data

Oct. 10, 2018  (JP) .............................. JP2018-191919

(51) Int. Cl.
*F01N 3/02*    (2006.01)
*F01N 3/04*    (2006.01)
(Continued)

(52) U.S. Cl.
CPC ........... *F01N 3/0205* (2013.01); *B01D 53/22* (2013.01); *F01N 3/043* (2013.01); *F01N 3/055* (2013.01); *F01N 3/08* (2013.01); *F01P 3/20* (2013.01)

(58) Field of Classification Search
CPC .. B01D 51/10; B01D 53/22; B01D 2257/504; B01D 2258/01; F01N 13/0093; F01N 3/00; F01N 3/0205; F01N 3/021; F01N 3/043; F01N 3/055; F01N 3/08; F01N 3/0857; F01N 5/02; F01N 9/00; F01N 2240/02; F01N 2510/068; F01N 2570/10; F01N 2900/00; F01N 2570/1404; F01P 3/12; F01P 3/20; F01P 7/04; F01P 2007/146; F01P 2025/13; F01P 2025/30; F01P 2025/36; F01P 2025/64; F01P 2060/16; F02G 5/02; Y02C 20/40
(Continued)

(56) References Cited

U.S. PATENT DOCUMENTS

2013/0186075 A1* 7/2013 Myers ................ F01N 5/02
                                                60/320
2013/0298761 A1* 11/2013 Hamad ................ F01N 3/04
                                                95/11
2014/0208754 A1* 7/2014 Nagai .................. F01K 23/10
                                                60/655

FOREIGN PATENT DOCUMENTS

JP    2006-144662 A    6/2006

* cited by examiner

*Primary Examiner* — Audrey K Bradley
*Assistant Examiner* — Dapinder Singh
(74) *Attorney, Agent, or Firm* — Oliff PLC

(57) ABSTRACT

The separation efficiency of carbon dioxide is improved by making the temperature of exhaust gas further low. An exhaust gas purification apparatus for an internal combustion engine includes a first heat exchanger arranged in an exhaust passage of an internal combustion engine and configured to carry out heat exchange between outside air and exhaust gas of the internal combustion engine, a second heat exchanger arranged in the exhaust passage and configured to carry out heat exchange between a circulating heating medium and the exhaust gas, and a carbon dioxide separator arranged in the exhaust passage at the downstream side of the first heat exchanger and the second heat exchanger and configured to separate carbon dioxide from the exhaust gas.

9 Claims, 7 Drawing Sheets

(51) Int. Cl.
  *B01D 53/22* (2006.01)
  *F01N 3/08* (2006.01)
  *F01P 3/20* (2006.01)
  *F01N 3/05* (2006.01)
(58) Field of Classification Search
  USPC .......................................... 60/297, 311, 320
  See application file for complete search history.

EXHAUST GAS PURIFICATION APPARATUS FOR INTERNAL COMBUSTION ENGINE

CROSS REFERENCE TO RELATED APPLICATION

This application claims the benefit of Japanese Patent Application No. 2018-191919, filed on Oct. 10, 2018, which is hereby incorporated by reference herein in its entirety.

TECHNICAL FIELD

The present disclosure relates to an exhaust gas purification apparatus for an internal combustion engine.

BACKGROUND ART

There has been known a technology in which the temperature of a sensor mounted on an exhaust passage of an internal combustion engine is estimated based on the temperature of exhaust gas and the amount of running wind so as to prevent the temperature of the sensor from rising excessively, and when the sensor temperature thus estimated reaches a predetermined temperature, the temperature of the exhaust gas is decreased by increasing the amount of fuel supply to the internal combustion engine (for example, refer to patent literature 1).

CITATION LIST

Patent Literature

Patent Literature 1: Japanese patent application laid-open publication No. 2006-144662

SUMMARY

Technical Problem

Although the temperature of the exhaust gas can be made low by increasing the amount of fuel supply to the internal combustion engine, that alone may be insufficient in some cases. Here, a carbon dioxide separator may be provided in the exhaust passage. This carbon dioxide separator has a carbon dioxide separation membrane through which only carbon dioxide can pass, for example, and when the carbon dioxide in the exhaust gas passes through the carbon dioxide separation membrane, carbon dioxide is separated from the exhaust gas. In this carbon dioxide separator, the separation of carbon dioxide can be more promoted as the concentration of carbon dioxide in the carbon dioxide separator becomes higher. For example, when the volumetric flow rate of exhaust gas is decreased by cooling the exhaust gas, the concentration per volume of carbon dioxide in the carbon dioxide separator increases, whereby a larger amount of carbon dioxide passes through the carbon dioxide separation membrane. For this reason, the separation efficiency of carbon dioxide can be more enhanced as the temperature of the exhaust gas flowing into the carbon dioxide separator is lower. Here, note that the separation efficiency of carbon dioxide can be defined as the ratio of the amount of separated carbon dioxide with respect to the amount of carbon dioxide having flowed into the carbon dioxide separator. Thus, there is a fear that only by increasing the amount of fuel supply to the internal combustion engine as in the past, the temperature of the exhaust gas will not become so low that the carbon dioxide therein can be separated to a sufficient extent.

The present disclosure has been made in view of the problem as mentioned above, and the object of the present disclosure is to improve the separation efficiency of carbon dioxide by further decreasing the temperature of exhaust gas.

Solution to Problem

In order to solve the above-mentioned problem, according to one aspect of the present disclosure, there is provided an exhaust gas purification apparatus for an internal combustion engine comprising: a first heat exchanger arranged in an exhaust passage of the internal combustion engine, and configured to carry out heat exchange between outside air and exhaust gas of the internal combustion engine; a second heat exchanger arranged in the exhaust passage, and configured to carry out heat exchange between a circulating heating medium and the exhaust gas; and a carbon dioxide separator arranged in the exhaust passage at the downstream side of the first heat exchanger and the second heat exchanger, and configured to separate carbon dioxide from the exhaust gas.

The first heat exchanger decreases the temperature of the exhaust gas by carrying out heat exchange between the outside air and the exhaust gas. Usually, the outside air is lower in temperature than the exhaust gas, and hence, when heat exchange is carried out between the outside air and the exhaust gas, the temperature of the exhaust gas will become lower. For example, in cases where the internal combustion engine is mounted on a vehicle, when the vehicle runs, it becomes possible to introduce a larger amount of running wind into the first heat exchanger, thus making it possible to further decrease the temperature of the exhaust gas. The second heat exchanger decreases the temperature of the exhaust gas by carrying out heat exchange between the heating medium and the exhaust gas, while circulating the heating medium other than the outside air. The heating medium may be in the state of either gas or liquid. The order of arrangement of the first heat exchanger and the second heat exchanger in the exhaust passage can be arbitrarily decided. The carbon dioxide separator is a device in which the separation efficiency of carbon dioxide becomes higher as the temperature of the exhaust gas is lower. Accordingly, the separation efficiency of carbon dioxide in the carbon dioxide separator can be made higher by decreasing the temperature of the exhaust gas by means of the first heat exchanger and the second heat exchanger.

The heating medium may be cooling water of the internal combustion engine. The cooling water of the internal combustion engine is lower in temperature than the exhaust gas, so the temperature of the exhaust gas can be decreased by heat exchange being carried out between the cooling water and the exhaust gas. In addition, by using the cooling water of the internal combustion engine as the heating medium, a radiator, etc., can be shared, thereby making it possible to reduce costs. On the other hand, cooling water (e.g., cooling water of a transmission, or cooling water provided for the second heat exchanger) different from the cooling water of the internal combustion engine can also be used as the heating medium. In this case, it becomes possible to make the temperature of the heating medium lower than that of the cooling water of the internal combustion engine, so it becomes possible to further decrease the temperature of the exhaust gas. Here, note that cooling oil can also be used in place of the cooling water.

The exhaust gas purification apparatus may further comprise: a circulator configured to circulate the heating medium in the second heat exchanger; and a controller configured to control the circulator; wherein the second heat exchanger may be arranged in the exhaust passage at the downstream side of the first heat exchanger, and the controller does not need to circulate the heating medium through the second heat exchanger, in cases where a first exhaust gas temperature, which is the temperature of the exhaust gas after the exhaust gas and the outside air carry out heat exchange in the first heat exchanger, is equal to or less than a first threshold value.

In addition, the exhaust gas purification apparatus may further comprise: a circulator configured to circulate the heating medium in the second heat exchanger; and a controller configured to control the circulator; wherein the second heat exchanger may be arranged in the exhaust passage at the upstream side of the first heat exchanger, and the controller does not need to circulate the heating medium through the second heat exchanger, in cases where a first exhaust gas temperature, which is the temperature of the exhaust gas after the exhaust gas and the outside air carry out heat exchange in the first heat exchanger and which is the temperature of the exhaust gas at the time when the heating medium is not circulated through the second heat exchanger, is equal to or less than a first threshold value.

The circulator is provided with a pump for delivering the heating medium, for example. Moreover, the circulator may be provided with a valve for interrupting the circulation of the heating medium. The controller controls the circulation of the heating medium in the second heat exchanger by controlling the pump or the valve, for example. By circulating the heating medium through the second heat exchanger, the temperature of the exhaust gas can be decreased in the second heat exchanger, but energy is required in order to circulate the heating medium through the second heat exchanger, so the amount of fuel consumption of the internal combustion engine increases. For example, in cases where the pump is driven by a motor, the load of the internal combustion engine is increased in order to increase the amount of power generation in the internal combustion engine, and hence, the amount of fuel consumption increases. Here, if the temperature of the exhaust gas can be sufficiently decreased only by the first heat exchanger, it will not be necessary to decrease the temperature of the exhaust gas by the second heat exchanger. In this case, it will not be necessary to circulate the heating medium through the second heat exchanger. Then, if the heating medium is not circulated through the second heat exchanger, the amount of fuel consumption will be able to be reduced. That is, in cases where the first exhaust gas temperature is equal to or less than the first threshold value, it can be determined that the temperature of the exhaust gas can be sufficiently decreased only by the first heat exchanger, so the heating medium does not need to be circulated through the second heat exchanger. The first exhaust gas temperature is the temperature of the exhaust gas after being decreased only by the first heat exchanger. The first exhaust gas temperature may be the temperature estimated by the controller. Also, the first exhaust gas temperature may be the temperature of the exhaust gas estimated in the case of assuming that the heating medium does not circulate through the second heat exchanger. In cases where the second heat exchanger is arranged in the exhaust passage at the downstream side of the first heat exchanger, the temperature of the exhaust gas at the downstream side of the first heat exchanger and at the upstream side of the second heat exchanger may be used as the first exhaust gas temperature. The first threshold value is an upper limit value of the temperature at which the separation efficiency of carbon dioxide falls within an allowable range, even if the heating medium is not circulated through the second heat exchanger. Here, note that the first threshold value may be an upper limit value of the temperature of the exhaust gas at which the amount of carbon dioxide discharged into the atmosphere falls within an allowable range, even if the heating medium is not circulated through the second heat exchanger. As a method of preventing the heating medium from circulating through the second heat exchanger, there can be exemplified a method of stopping the pump that delivers the heating medium, or a method of arranging the valve in a passage for the heating medium and closing the valve.

In cases where the first exhaust gas temperature is higher than the first threshold value, the controller may circulate the heating medium through the second heat exchanger in cases where a second amount of decrease, which is an amount of decrease in the temperature of the exhaust gas by the second heat exchanger at the time when the heating medium circulates through the second heat exchanger, is larger than a second threshold value, whereas the controller does not need to circulate the heating medium through the second heat exchanger in cases where the second amount of decrease is equal to or less than the second threshold value.

In cases where the first exhaust gas temperature is higher than the first threshold value, the separation efficiency of carbon dioxide can not be sufficiently enhanced only by the decrease of temperature of the exhaust gas by the first heat exchanger. Accordingly, it is considered that the temperature of the exhaust gas can be decreased in the second heat exchanger, too, by circulating the heating medium through the second heat exchanger. However, when the amount of fuel consumption of the internal combustion engine is increased by circulating the heating medium through the second heat exchanger, the amount of carbon dioxide discharged from the internal combustion engine will also increase. As a result of this, there will be a fear that the amount of carbon dioxide unable to be separated by the carbon dioxide separator increases. On the other hand, even if the heating medium is circulated through the second heat exchanger, the temperature of the exhaust gas will sometimes hardly be decreased in the second heat exchanger. That is, in some cases, the amount of carbon dioxide discharged into the atmosphere may increase more when the heating medium is circulated through the second heat exchanger than when the heating medium is not circulated therethrough. Accordingly, in cases where the amount of discharge of carbon dioxide into the atmosphere increases when the heating medium is circulated through the second heat exchanger, the amount of discharge of carbon dioxide into the atmosphere is suppressed from increasing, by preventing the heating medium from being circulated through the second heat exchanger. The second threshold value is an upper limit value of the amount of decrease in the temperature of the exhaust gas at which the amount of carbon dioxide discharged into the atmosphere becomes larger in the case where the heating medium is circulated through the second heat exchanger than in the case where it is not circulated. In addition, the second amount of decrease may be an amount of decrease in the temperature estimated by the controller.

The exhaust gas purification apparatus may further comprise: a circulator configured to circulate the heating medium in the second heat exchanger; and a controller configured to control the circulator; wherein the controller does not need to circulate the heating medium through the second heat exchanger, in cases where a second amount of decrease, which is an amount of decrease in the temperature of the exhaust gas by the second heat exchanger at the time when the heating medium circulates through the second heat exchanger, is equal to or less than the second threshold value.

That is, even if the heating medium is circulated through the second heat exchanger, in cases where the temperature of the exhaust gas does not become low sufficiently in the second heat exchange, the amount of fuel consumption of the internal combustion engine can be reduced by preventing the heating medium from being circulated through the second heat exchanger irrespective of the decrease of temperature of the exhaust gas by the first heat exchanger. That is, the amount of discharge of carbon dioxide into the atmosphere can be reduced by reducing the amount of discharge of carbon dioxide from the internal combustion engine. The second threshold value in this case is also an upper limit value of the amount of decrease in the temperature of the exhaust gas at which the amount of carbon dioxide discharged into the atmosphere becomes larger in the case where the heating medium is circulated through the second heat exchanger than in the case where it is not circulated. In addition, the second amount of decrease may be an amount of decrease in the temperature estimated by the controller.

The second heat exchanger may be arranged in the exhaust passage at the downstream side of the first heat exchanger, wherein in cases where the second amount of decrease is larger than the second threshold value, the controller may circulate the heating medium through the second heat exchanger in cases where the first exhaust gas temperature, which is the temperature of the exhaust gas after the exhaust gas and the outside air carry out heat exchange in the first heat exchanger, is higher than the first threshold value, whereas the controller does not need to circulate the heating medium through the second heat exchanger in cases where the first exhaust gas temperature is equal to or less than the first threshold value.

In addition, the second heat exchanger may be arranged in the exhaust passage at the upstream side of the first heat exchanger, wherein in cases where the second amount of decrease is larger than the second threshold value, the controller may circulate the heating medium through the second heat exchanger in cases where the first exhaust gas temperature, which is the temperature of the exhaust gas after the exhaust gas and the outside air carry out heat exchange in the first heat exchanger and which is the temperature of the exhaust gas at the time when the heating medium is not circulated through the second heat exchanger, is higher than the first threshold value, whereas the controller does not need to circulate the heating medium through the second heat exchanger in cases where the first exhaust gas temperature is equal to or less than the first threshold value.

The temperature of the exhaust gas can sometimes be sufficiently decreased by the first heat exchanger, irrespective of the heating medium being circulated through the second heat exchanger. In this case, it is not necessary to decrease the temperature of the exhaust gas by the second heat exchanger. That is, it is not necessary to circulate the heating medium through the second heat exchanger. Then, if the heating medium is not circulated through the second heat exchanger, the amount of fuel consumption will be able to be reduced. The first threshold value in this case is also the upper limit value of the temperature at which the separation efficiency of carbon dioxide falls within the allowable range, even if the heating medium is not circulated through the second heat exchanger. Here, note that the first threshold value may be the upper limit value of the temperature of the exhaust gas at which the amount of carbon dioxide discharged into the atmosphere falls within the allowable range, even if the heating medium is not circulated through the second heat exchanger. The first exhaust gas temperature may be the temperature estimated by the controller. Also, the first exhaust gas temperature may be the temperature of the exhaust gas estimated in the case of assuming that the heating medium does not circulate through the second heat exchanger. In addition, in cases where the second heat exchanger is arranged in the exhaust passage at the downstream side of the first heat exchanger, the temperature of the exhaust gas at the downstream side of the first heat exchanger and at the upstream side of the second heat exchanger may be used as the first exhaust gas temperature.

According to the present disclosure, it is possible to improve the separation efficiency of carbon dioxide by further decreasing the temperature of exhaust gas.

DESCRIPTION OF EMBODIMENTS

Hereinafter, modes for carrying out the present disclosure will be described in detail by way of example based on preferred embodiments thereof with reference to the attached drawings. However, the dimensions, materials, shapes, relative arrangements and so on of component parts described in the embodiments are not intended to limit the scope of the present disclosure to these alone in particular as long as there are no specific statements.

First Embodiment

Figure 1:
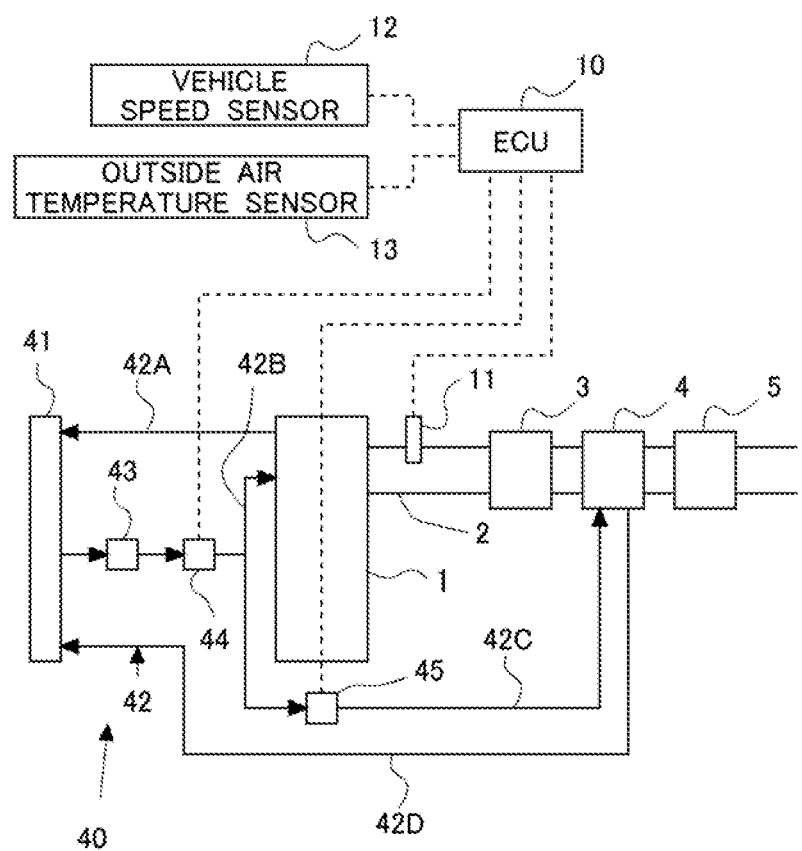
FIG. 1 is a view illustrating the schematic construction of an exhaust gas purification apparatus for an internal combustion engine according to a first embodiment of the present disclosure.

FIG. 1 is a view illustrating the schematic construction of an exhaust gas purification apparatus for an internal combustion engine 1 according to a first embodiment of the present disclosure. The internal combustion engine 1 is a gasoline engine or a diesel engine for driving a vehicle, for example. An exhaust passage 2 is connected to the internal combustion engine 1. In the exhaust passage 2, there are arranged a first heat exchanger 3, a second heat exchanger 4, and a carbon dioxide separator 5 in this order from the upstream side in the direction of flow of exhaust gas. In the exhaust passage at the upstream side of the first heat exchanger 3, there is arranged an exhaust gas temperature sensor 11 for detecting the temperature of the exhaust gas.

Figure 2:
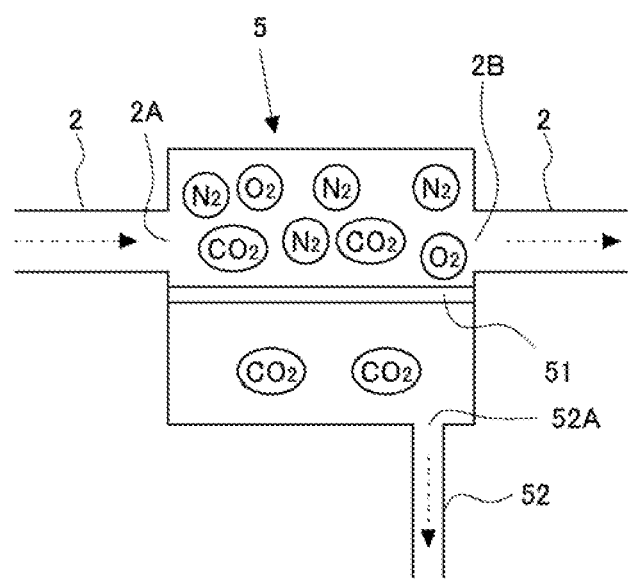
FIG. 2 is a view illustrating the schematic construction of a carbon dioxide separator.

The first heat exchanger 3 is configured to carry out heat exchange between outside air and the exhaust gas of the internal combustion engine 1 flowing through the exhaust passage 2. The second heat exchanger 4 is configured to carry out heat exchange between cooling water of the internal combustion engine 1 and the exhaust gas of the internal combustion engine 1 flowing through the exhaust passage 2. The carbon dioxide separator 5 is to separate carbon dioxide from the exhaust gas. FIG. 2 is a view illustrating the schematic construction of the carbon dioxide separator 5. Here, note that the carbon dioxide separator is not limited to the construction shown in FIG. 2. An arrow of a broken line in FIG. 2 indicates a direction in which the exhaust gas flows. The carbon dioxide separator 5 is provided with a carbon dioxide separation membrane 51 formed in the shape of a membrane which mainly passes carbon dioxide among the components included in the exhaust gas. The carbon dioxide separation membrane 51 divides the interior space of the carbon dioxide separator 5 into two parts, wherein an inlet port 2A and an outlet port 2B for exhaust gas are formed in one of the divided spaces, and an outlet port 52A for carbon dioxide is formed in the other divided space. The exhaust passage 2 is connected to the exhaust gas inlet port 2A and the exhaust gas outlet port 2B. A carbon dioxide discharge passage 52 through which carbon dioxide flows is connected to the carbon dioxide outlet port 52A. When the exhaust gas having flowed into the carbon dioxide separator 5 from the exhaust gas inlet port 2A contacts the carbon dioxide separation membrane 51, the carbon dioxide in the exhaust gas will pass through the carbon dioxide separation membrane 51, and will be separated from the other components therein. The other separated components are discharged from the exhaust gas outlet port 2B. On the other hand, the gas having passed through the carbon dioxide separation membrane 51 is discharged from the carbon dioxide outlet port 52A, and flows through the carbon dioxide discharge passage 52. Thus, the gas whose concentration of carbon dioxide is relatively low flows through the exhaust passage at the downstream side of the carbon dioxide separator 5, whereas the gas whose concentration of carbon dioxide is relatively high flows into the carbon dioxide discharge passage 52. The carbon dioxide discharge passage 52 is connected to a tank that stores carbon dioxide, for example, and the carbon dioxide having flowed through the carbon dioxide discharge passage 52 is stored in this tank.

In addition, in the second heat exchanger 4, the cooling water is circulated by a cooling water circulation system 40. The cooling water circulation system 40 circulates the cooling water of the internal combustion engine 1 through the internal combustion engine 1 and the second heat exchanger 4. The cooling water circulation system 40 includes a radiator 41 configured to carry out heat exchange between the outside air and the cooling water, a cooling water passage 42 through which the cooling water flows, a pump 43 arranged in the cooling water passage 42 for delivering the cooling water, a cooling water temperature sensor 44 for detecting the temperature of the cooling water at the immediate downstream side of the pump 43, and a valve 45 for opening and closing the cooling water passage 42 that leads to the second heat exchanger 4. Here, note that the valve 45 or the cooling water circulation system 40 is an example of a circulator. The cooling water passage 42 has a first passage 42A, a second passage 42B, a third passage 42C, and a fourth passage 42D. The first passage 42A connects the internal combustion engine 1 and the radiator 41 with each other so as to allow the cooling water discharged from the internal combustion engine 1 to flow into the radiator 41. The second passage 42B connects the internal combustion engine 1 and the radiator 41 with each other through the pump 43 and the cooling water temperature sensor 44 so as to allow the cooling water discharged from the radiator 41 to flow into the internal combustion engine 1. The third passage 42C connects the radiator 41 and the second heat exchanger 4 with each other through the pump 43, the cooling water temperature sensor 44 and the valve 45 so as to allow the cooling water discharged from the radiator 41 to flow into the second heat exchanger 4. The fourth passage 42D connects the radiator 41 and the second heat exchanger 4 with each other so as to allow the cooling water discharged from the second heat exchanger 4 to flow into the radiator 41. Here, note that the second passage 42B and the third passage 42C share a passage from the radiator 41 to the downstream side of the cooling water temperature sensor 44. The pump 43 delivers the cooling water from the side of the radiator 41 to the side of the internal combustion engine 1 or to the side of the second heat exchanger 4, in the second passage 42B and the third passage 42C. Here, note that the pump 43 may obtain its driving force from an electric motor, or from the internal combustion engine 1.

In cases where the pump 43 is operated and the valve 45 is closed, the cooling water flows through the first passage 42A and the second passage 42B, whereby the cooling water of the internal combustion engine 1 circulates through the internal combustion engine 1 and the radiator 41. On the other hand, in cases where the pump 43 is operated and the valve 45 is opened, the cooling water also further flows through the third passage 42C and the fourth passage 42D, in addition to the first passage 42A and the second passage 42B. With this, the cooling water of the internal combustion engine 1 flows through the second heat exchanger 4, too. The temperature of the cooling water of the internal combustion engine 1 is usually higher than the temperature of the outside air, so when the cooling water passes through the radiator 41, the temperature of the cooling water will drop. In addition, the temperature of the exhaust gas of the internal combustion engine 1 is usually higher than the temperature of the cooling water, so when the cooling water passes through the second heat exchanger 4, the temperature of the cooling water will rise, and the temperature of the exhaust gas will drop. Here, when the exhaust gas from the internal combustion engine 1 passes through the first heat exchanger 3, heat exchange will be carried out between the exhaust gas and the outside air. Accordingly, when the exhaust gas passes through the first heat exchanger 3, the temperature of the exhaust gas will drop. Moreover, in cases where the valve 45 is opened, heat exchange will be carried out between the exhaust gas and the cooling water of the internal combustion engine 1 when the exhaust gas passes through the second heat exchanger 4. As a result, the temperature of the exhaust gas will further drop. Accordingly, the temperature of the exhaust gas flowing into the carbon dioxide separator 5 can be made sufficiently low, so the separation efficiency of carbon dioxide can be enhanced.

Then, an electronic control unit (ECU) 10, which is a controller, is provided along with the internal combustion engine 1. The ECU 10 is a computer having a processor, a main storage unit, and an auxiliary storage unit. The ECU 10 controls the operating state of the internal combustion engine 1, the exhaust gas purification apparatus, etc. At this time, the processor executes a predetermined program on the main storage unit. A vehicle speed sensor 12 and an outside air temperature sensor 13 in addition to the above-mentioned exhaust gas temperature sensor 11 are electrically connected to the ECU 10, and the detection value of each sensor is passed to the ECU 10. The vehicle speed sensor 12 is to detect the speed of the vehicle with the internal combustion engine 1 mounted thereon. The outside air temperature sensor 13 is to detect the temperature of the outside air. The temperature of this outside air is that of the outside air before coming in contact with the first heat exchanger 3.

The ECU 10 controls the opening and closing of the valve 45. Here, as the temperature of the exhaust gas flowing into the carbon dioxide separator 5 becomes lower, the concentration per volume of carbon dioxide becomes higher, so the opportunity for the carbon dioxide in the exhaust gas to contact the carbon dioxide separation membrane 51 increases more. As a result of this, the separation efficiency of carbon dioxide becomes higher. On the other hand, the temperature of the exhaust gas may become sufficiently low only due to the exhaust gas passing through the first heat exchanger 3. In such a case, it is not necessary to decrease the temperature of the exhaust gas by the second heat exchanger 4. Then, in cases where it is not necessary to decrease the temperature of the exhaust gas by the second heat exchanger 4, the valve 45 can be closed. When the cooling water stops circulating through the second heat exchanger 4 by closing the valve 45, the load of the pump 43 will be decreased, so the load of the internal combustion engine 1 can be decreased. For example, in cases where the pump 43 is an electric pump, the amount of electric power generated by the internal combustion engine 1 can be reduced by decreasing the load of the pump 43, so the load of the internal combustion engine 1 can be made to reduce. Then, by reducing the load of the internal combustion engine 1, the fuel consumption of the internal combustion engine 1 is reduced, thus making it possible to reduce the amount of carbon dioxide discharged from the internal combustion engine 1. As a result of this, the amount of carbon dioxide discharged into the atmosphere can be reduced.

Figure 3:
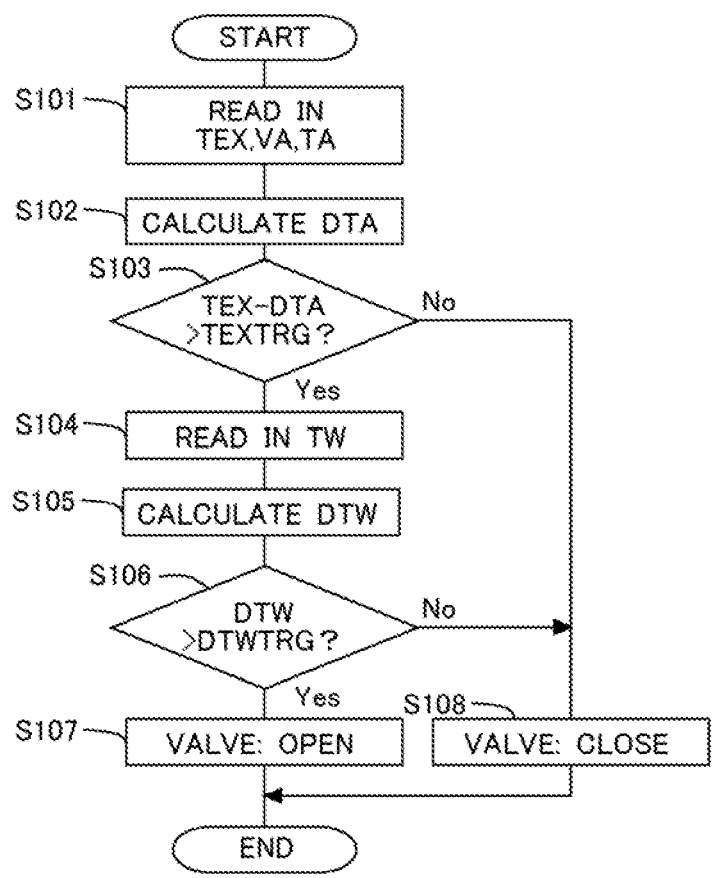
FIG. 3 is a flow chart illustrating a flow of opening and closing control of a valve according to the first embodiment of the present disclosure.

Accordingly, by controlling the opening and closing of the valve 45, the ECU 10 reduce the amount of carbon dioxide discharged into the atmosphere. FIG. 3 is a flow chart illustrating a flow or routine for opening and closing control of the valve 45. The opening and closing control of the valve 45 is carried out by means of the ECU 10 in a repeated manner at each predetermined time interval. In step S101, an exhaust gas temperature TEX, a vehicle speed VA, and an outside air temperature TA are read in. The exhaust gas temperature TEX is detected by the exhaust gas temperature sensor 11. The vehicle speed VA is detected by the vehicle speed sensor 12. The outside air temperature TA is detected by the outside air temperature sensor 13. In step S102, an amount of decrease DTA of the exhaust gas temperature in the first heat exchanger 3 is calculated. The amount of decrease DTA of the exhaust gas temperature in the first heat exchanger 3 is in correlation with the vehicle speed VA, the outside air temperature TA, etc., so these relations have been obtained in advance through experiments, simulations or the like, and made into a map. In addition, the amount of decrease DTA of the exhaust gas temperature in the first heat exchanger 3 can also be obtained by using a physical model or the like based on the specifications of the first heat exchanger 3, a difference between the outside air temperature TA and the exhaust gas temperature TEX, etc. Here, note that the amount of decrease DTA of the exhaust gas temperature in the first heat exchanger 3 may be calculated by a well-known method.

In step S103, it is determined whether a difference (TEX−DTA) between the exhaust gas temperature TEX and the amount of decrease DTA of the exhaust gas temperature is higher (larger) than a target temperature TEXTRG. The difference (TEX−DTA) between the exhaust gas temperature TEX and the amount of decrease DTA of the exhaust gas temperature represents an exhaust gas temperature after the exhaust gas passes through the first heat exchanger 3. The target temperature TEXTRG is an upper limit value of the temperature at which the separation efficiency of carbon dioxide in the carbon dioxide separator 5 falls within an allowable range. The target temperature TEXTRG is an example of the first threshold value. When the above-mentioned difference (TEX−DTA) is equal to or less than the target temperature TEXTRG, it will not be necessary to decrease the exhaust gas temperature in the second heat exchanger 4. Accordingly, in cases where a negative determination is made in step S103, the routine advances to step S108, in which the valve 45 is closed. As a result of this, the cooling water comes to stop circulating through the second heat exchanger 4, so the load of the pump 43 can be reduced, thus making it possible to reduce the fuel consumption of the internal combustion engine 1. On the other hand, in cases where an affirmative determination is made in step S103, the routine advances to step S104.

In step S104, a temperature TW of the cooling water of the internal combustion engine 1 is read in. The cooling water temperature TW is detected by the cooling water temperature sensor 44. In step S105, an amount of decrease DTW of the exhaust gas temperature in the second heat exchanger 4 is calculated. This amount of decrease DTW of the exhaust gas temperature is an amount of decrease of the exhaust gas temperature in the second heat exchanger 4 in the case of assuming that the valve 45 is opened. The amount of decrease DTW of the exhaust gas temperature in the second heat exchanger 4 is in correlation with the cooling water temperature TW, etc., so this relation has been obtained in advance through experiments, simulations or the like, and made into a map. In addition, the amount of decrease DTW of the exhaust gas temperature in the second heat exchanger 4 can also be obtained by using a physical model or the like based on the specifications of the second heat exchanger 4, a difference between the cooling water temperature TW and the exhaust gas temperature (TEX−DTA), etc. Here, note that the amount of decrease DTW of the exhaust gas temperature in the second heat exchanger 4 may be calculated by a well-known method.

In step S106, it is determined whether the amount of decrease DTW of the exhaust gas temperature in the second heat exchanger 4 is larger than a target amount of decrease DTWTRG. The target amount of decrease DTWTRG is an upper limit value of the amount of decrease in the temperature of the exhaust gas at which the amount of carbon dioxide discharged into the atmosphere becomes larger in the case where the cooling water is circulated through the second heat exchanger 4 than in the case where it is not circulated. The target amount of decrease DTWTRG is an example of a second threshold value. When the amount of decrease DTW of the exhaust gas temperature in the second heat exchanger 4 is equal to or less than the target amount of decrease DTWTRG, it will be determined that a demerit due to an increase in carbon dioxide discharged into the atmosphere is larger than a merit due to a decrease in the exhaust gas temperature in the second heat exchanger 4. Accordingly, in cases where a negative determination is made in step S106, the routine advances to step S108, in which the valve 45 is closed. As a result of this, the cooling water comes to stop circulating through the second heat exchanger 4, so the load of the pump 43 can be reduced, thus making it possible to reduce the fuel consumption of the internal combustion engine 1. On the other hand, in cases where an affirmative determination is made in step S106, the routine advances to step S107. In step S107, the valve 45 is opened. With this, the cooling water is circulated through the second heat exchanger 4, so the exhaust gas temperature can be decreased in the second heat exchanger 4.

In this manner, by provision of the first heat exchanger 3 and the second heat exchanger 4, the temperature of the exhaust gas flowing into the carbon dioxide separator 5 can be decreased to a sufficient extent, thus making it possible to enhance the separation efficiency of carbon dioxide in the carbon dioxide separator 5. In addition, in cases where it is not necessary to decrease the exhaust gas temperature by the second heat exchanger 4, or in cases where the amount of discharge of carbon dioxide into the atmosphere will increase when the exhaust gas temperature is decreased by the second heat exchanger 4, the cooling water is not circulated through the second heat exchanger 4, and hence, the fuel consumption of the internal combustion engine 1 can be reduced, and the amount of discharge of carbon dioxide into the exhaust gas can be reduced.

Second Embodiment

Figure 4:
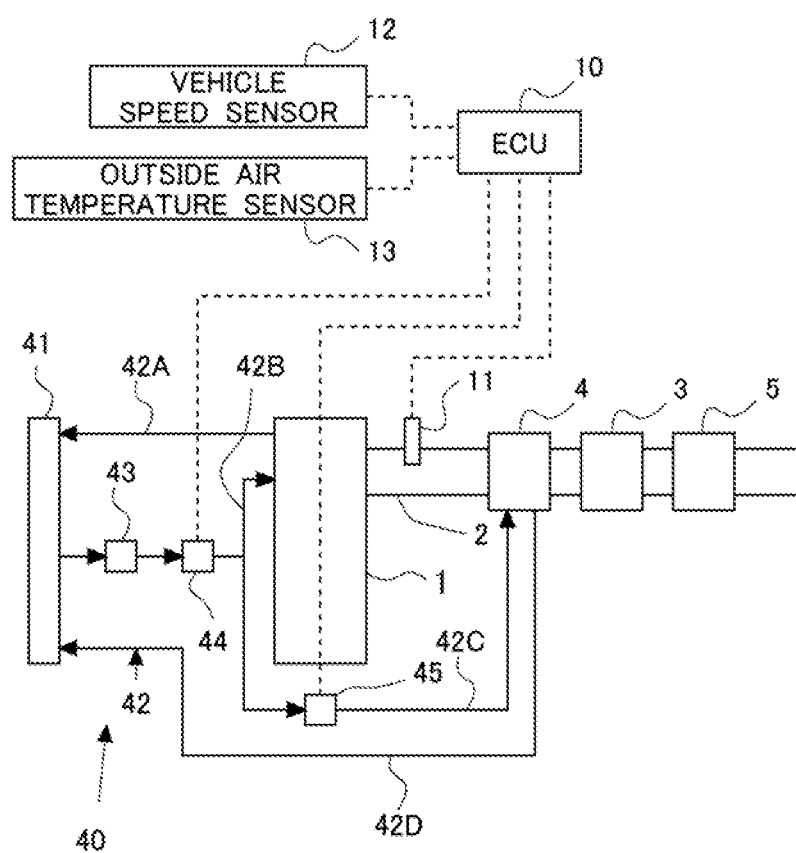
FIG. 4 is a view illustrating the schematic construction of an exhaust gas purification apparatus for an internal combustion engine according to a second embodiment of the present disclosure.

FIG. 4 is a view illustrating the schematic construction of an exhaust gas purification apparatus for an internal combustion engine 1 according to a second embodiment of the present disclosure. Differences of FIG. 4 (this second embodiment) from FIG. 1 (the above-mentioned first embodiment) will be mainly explained. In this second embodiment, the second heat exchanger 4 is arranged in the exhaust passage 2 at the upstream side of the first heat exchanger 3. Here, the first heat exchanger 3 carries out heat exchange between the outside air and the exhaust gas, so the amount of decrease of the exhaust gas temperature becomes larger as the temperature of the outside air is lower. In cases where the first heat exchanger 3 is arranged close to the internal combustion engine 1, outside air, of which the temperature has become high due to its circulation around the internal combustion engine 1, comes in contact with the first heat exchanger 3, and hence, there is a fear that the amount of decrease of the exhaust gas temperature may become small. On the other hand, in cases where the first heat exchanger 3 is arranged away from the internal combustion engine 1, the temperature of the outside air in contact with the first heat exchanger 3 becomes lower, so the amount of decrease of the exhaust gas temperature can be made larger.

Moreover, the cooling water passage 42 is connected to the second heat exchanger 4. As this cooling water passage 42 becomes longer, the load of the pump 43 increases, and the cost thereof increases. In contrast to this, the cooling water passage 42 can be made short, by arranging the second heat exchanger 4 at a location close to the radiator 41. Accordingly, by arranging the second heat exchanger 4 in the exhaust passage 2 at the upstream side of the first heat exchanger 3, the amount of decrease of the exhaust gas temperature by the first heat exchanger 3 can be made larger, and the load of the pump 43 can be decreased, while reducing the cost of arranging the second heat exchanger 4.

Figure 5:
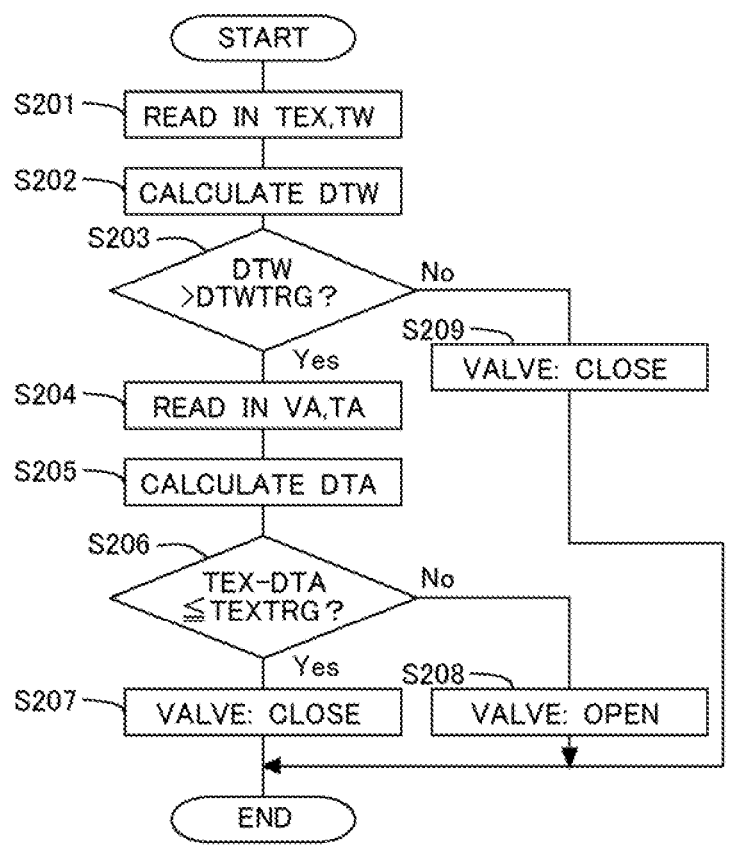
FIG. 5 is a flow chart illustrating a flow of opening and closing control of a valve according to the second embodiment of the present disclosure.

In the above-mentioned configuration, too, the opening and closing control of the valve 45 illustrated in FIG. 3 can be carried out. The exhaust gas temperature TEX in step S103 in this case is the exhaust gas temperature at the time when the cooling water does not circulate through the second heat exchanger 4. Here, note that the detected value of the exhaust gas temperature sensor 11 read in step S101 may be assumed to be the temperature TEX of the exhaust gas flowing into the first heat exchanger 3. That is, the determination in step S103 may be carried out on the assumption that the exhaust gas temperature does not become lower in the second heat exchanger 4. On the other hand, the opening and closing control of the valve 45 may be carried out according to the following flow chart illustrated in FIG. 5. FIG. 5 is a flow chart illustrating a flow of the opening and closing control of the valve 45 according to this second embodiment of the present disclosure. The opening and closing control of the valve 45 is carried out by means of the ECU 10 in a repeated manner at each predetermined time interval. In step S201, the exhaust gas temperature TEX and the temperature TW of the cooling water of the internal combustion engine 1 are read in. The exhaust gas temperature TEX is detected by the exhaust gas temperature sensor 11. The cooling water temperature TW is detected by the cooling water temperature sensor 44. In step S202, the amount of decrease DTW of the exhaust gas temperature in the second heat exchanger 4 is calculated. The amount of decrease DTW of the exhaust gas temperature is the amount of decrease of the exhaust gas temperature in the second heat exchanger 4 at the time when the valve 45 is opened, i.e., the amount of decrease of the exhaust gas temperature in the second heat exchanger 4 at the time when the cooling water circulates through the second heat exchanger 4. Here, note that the ECU 10 may estimate the amount of decrease DTW of the exhaust gas temperature in the second heat exchanger 4, on the assumption that the valve 45 is opened. The amount of decrease DTW of the exhaust gas temperature in the second heat exchanger 4 is in correlation with the cooling water temperature TW, etc., so this relation has been obtained in advance through experiments, simulations or the like, and made into a map. In addition, the amount of decrease DTW of the exhaust gas temperature in the second heat exchanger 4 can also be obtained by using a physical model or the like based on the specifications of the second heat exchanger 4, a difference between the cooling water temperature TW and the exhaust gas temperature TEX, etc. Here, note that the amount of decrease DTW of the exhaust gas temperature in the second heat exchanger 4 may be calculated by a well-known method.

In step S203, it is determined whether the amount of decrease DTW of the exhaust gas temperature in the second heat exchanger 4 is larger than the target amount of decrease DTWTRG. The target amount of decrease DTWTRG is an upper limit value of the amount of decrease in the temperature of the exhaust gas at which the amount of carbon dioxide discharged into the atmosphere becomes larger in the case where the cooling water is circulated through the second heat exchanger 4 than in the case where it is not circulated. The target amount of decrease DTWTRG is an example of the second threshold value. In this step S203, it is determined whether the exhaust gas temperature can be decreased sufficiently in the second heat exchanger 4. Accordingly, in cases where a negative determination is made in step S203, the routine advances to step S209, in which the valve 45 is closed. As a result of this, the amount of discharge of carbon dioxide into the atmosphere can be suppressed from increasing. On the other hand, in cases where an affirmative determination is made in step S203, the routine advances to step S204.

In step S204, the vehicle speed VA and the outside air temperature TA are read in. The vehicle speed VA is detected by the vehicle speed sensor 12. The outside air temperature TA is detected by the outside air temperature sensor 13. In step S205, the amount of decrease DTA of the exhaust gas temperature in the first heat exchanger 3 is calculated. The amount of decrease DTA of the exhaust gas temperature in the first heat exchanger 3 is in correlation with the vehicle speed VA, the outside air temperature TA, etc., so these relations have been obtained in advance through experiments, simulations or the like, and made into a map. In addition, the amount of decrease DTA of the exhaust gas temperature in the first heat exchanger 3 can also be obtained by using a physical model or the like based on the specifications of the first heat exchanger 3, a difference between the outside air temperature TA and the exhaust gas temperature TEX at the upstream side of the first heat exchanger 3, etc. The exhaust gas temperature TEX in this case is the temperature of the exhaust gas flowing into the first heat exchanger 3 in the case of assuming that the valve 45 is closed, and it is set as the exhaust gas temperature detected by the exhaust gas temperature sensor 11. Here, note that the amount of decrease DTA of the exhaust gas temperature in the first heat exchanger 3 may be calculated by a well-known method.

In step S206, it is determined whether the difference (TEX−DTA) between the exhaust gas temperature TEX and the amount of decrease DTA of the exhaust gas temperature is higher (larger) than the target temperature TEXTRG. The exhaust gas temperature TEX at this time is the temperature of the exhaust gas flowing into the first heat exchanger 3 in the case of assuming that the valve 45 is closed, and it is set as the exhaust gas temperature detected by the exhaust gas temperature sensor 11. The difference (TEX−DTA) between the exhaust gas temperature TEX and the amount of decrease DTA of the exhaust gas temperature represents an exhaust gas temperature after decrease in the case where the exhaust gas temperature is decreased only by the first heat exchanger 3. The target temperature TEXTRG is an upper limit value of the temperature at which the separation efficiency of carbon dioxide in the carbon dioxide separator 5 falls within the allowable range. The target temperature TEXTRG is an example of the first threshold value. Accordingly, in this step S206, it is determined whether the exhaust gas temperature can be decreased sufficiently only by the first heat exchanger 3. Then, when the above-mentioned difference (TEX−DTA) is equal to or less than the target temperature TEXTRG, it will be able to decrease the exhaust gas temperature to a sufficient extent only by the first heat exchanger 3. Accordingly, in cases where an affirmative determination is made in step S206, the routine advances to step S207, in which the valve 45 is closed. As a result of this, the cooling water comes to stop circulating through the second heat exchanger 4, so the load of the pump 43 can be reduced, thus making it possible to reduce the fuel consumption of the internal combustion engine 1. On the other hand, in cases where a negative determination is made in step S206, the exhaust gas temperature can not be sufficiently decreased only by the first heat exchanger 3, and so the routine advances to step S208, in which the valve 45 is opened. With this, the exhaust gas temperature is decreased in the second heat exchanger 4, too.

In this manner, the separation efficiency of carbon dioxide can be improved, irrespective of the order of arrangement of the first heat exchanger 3 and the second heat exchanger 4. Here, note that the opening and closing control of the valve 45 illustrated in FIG. 5 can be carried out in the construction illustrated in FIG. 1, too.

Third Embodiment

Figure 6:
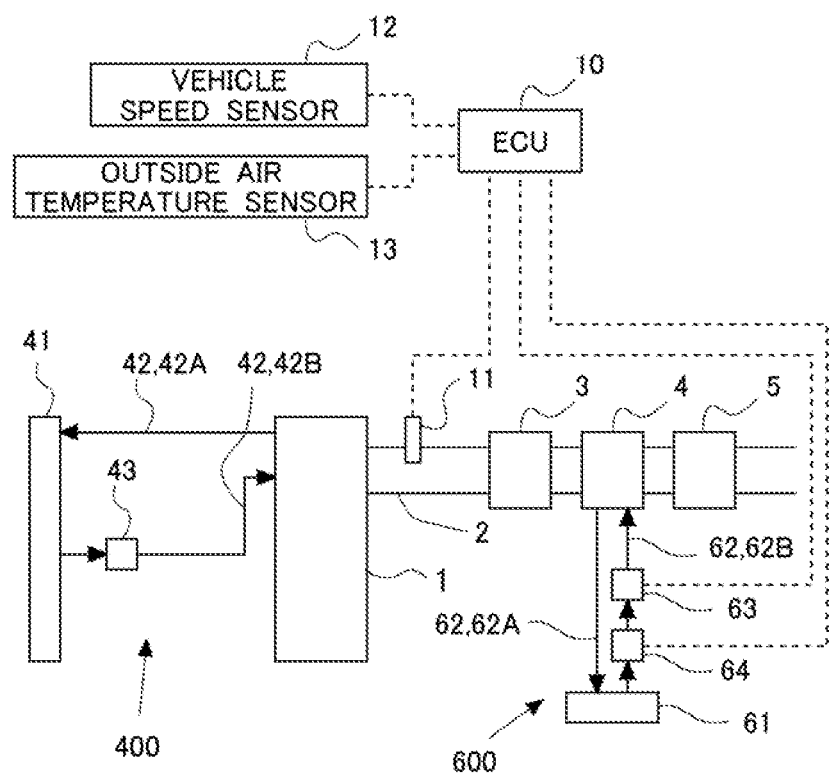
FIG. 6 is a view illustrating the schematic construction of an exhaust gas purification apparatus for an internal combustion engine according to a third embodiment of the present disclosure.

FIG. 6 is a view illustrating the schematic construction of an exhaust gas purification apparatus for an internal combustion engine 1 according to a third embodiment of the present disclosure. Differences of FIG. 6 (this third embodiment) from FIG. 1 (the above-mentioned first embodiment) will be mainly explained. In this third embodiment, cooling water different from that of the internal combustion engine 1 is circulated through the second heat exchanger 4. Here, note that the cooling water to be circulated through the second heat exchanger 4 may be cooling water exclusively prepared for cooling the exhaust gas in the second heat exchanger 4. In this third embodiment, the cooling water circulating through the internal combustion engine 1 is caused to circulate by a first cooling water circulation system 400, and the cooling water circulating through the second heat exchanger 4 is caused to circulate by a second cooling water circulation system 600.

The first cooling water circulation system 400 has a radiator 41 configured to carry out heat exchange between outside air and cooling water, a cooling water passage 42 through which the cooling water flows, and a pump 43 arranged in the cooling water passage 42 for delivering the cooling water. The cooling water passage 42 has a first passage 42A and a second passage 42B. The first passage 42A connects the internal combustion engine 1 and the radiator 41 with each other so as to allow the cooling water discharged from the internal combustion engine 1 to flow into the radiator 41. The second passage 42B connects the internal combustion engine 1 and the radiator 41 with each other through the pump 43 so as to allow the cooling water discharged from the radiator 41 to flow into the internal combustion engine 1.

The second cooling water circulation system 600 has a radiator 61 configured to carry out heat exchange between the outside air and the cooling water, a cooling water passage 62 through which the cooling water flows, a pump 63 arranged in the cooling water passage 62 for delivering the cooling water, and a cooling water temperature sensor 64 for detecting the temperature of the cooling water which circulates through the cooling water passage 62 between the pump 63 and the radiator 61. Here, note that the pump 63 or the second cooling water circulation system 600 is an example of the circulator. The cooling water passage 62 has a first passage 62A and a second passage 62B. The first passage 62A connects the radiator 61 and the second heat exchanger 4 with each other so as to allow the cooling water discharged from the second heat exchanger 4 to flow into the radiator 61. The second passage 62B connects the radiator 61 and the second heat exchanger 4 with each other so as to allow the cooling water discharged from the radiator 61 to flow into the second heat exchanger 4 through the cooling water temperature sensor 64 and the pump 63. The pump 63 delivers the cooling water from the side of the radiator 61 to the side of the second heat exchanger 4 in the second passage 62B. Here, note that the pump 63 may obtain its driving force from an electric motor. The first cooling water circulation system 400 and the second cooling water circulation system 600 are respectively independent from each other, and they are configured in such a manner that the cooling water circulating through the first cooling water circulation system 400 and the cooling water circulating through the second cooling water circulation system 600 do not mix with each other. Here, note that in this third embodiment, reference will be made to a configuration in which cooling water is circulated through the second heat exchanger 4, but there may be adopted another configuration in which a heating medium (e.g., cooling oil) other than and instead of the cooling water is circulated. In addition, the cooling water may be water added by an additive (e.g., an antifreezing solution).

The cooling water temperature sensor 64 is electrically connected to the ECU 10, so that the detected value of the cooling water temperature sensor 64 is passed to the ECU 10. The ECU 10 controls the operation of the pump 63, instead of the opening and closing control of the valve 45 in the first embodiment. That is, the pump 63 is stopped, instead of closing the valve 45 in the first embodiment, and the pump 63 is operated, instead of opening the valve 45 in the first embodiment. At this time, a processor executes a predetermined program on a main storage unit.

Figure 7:
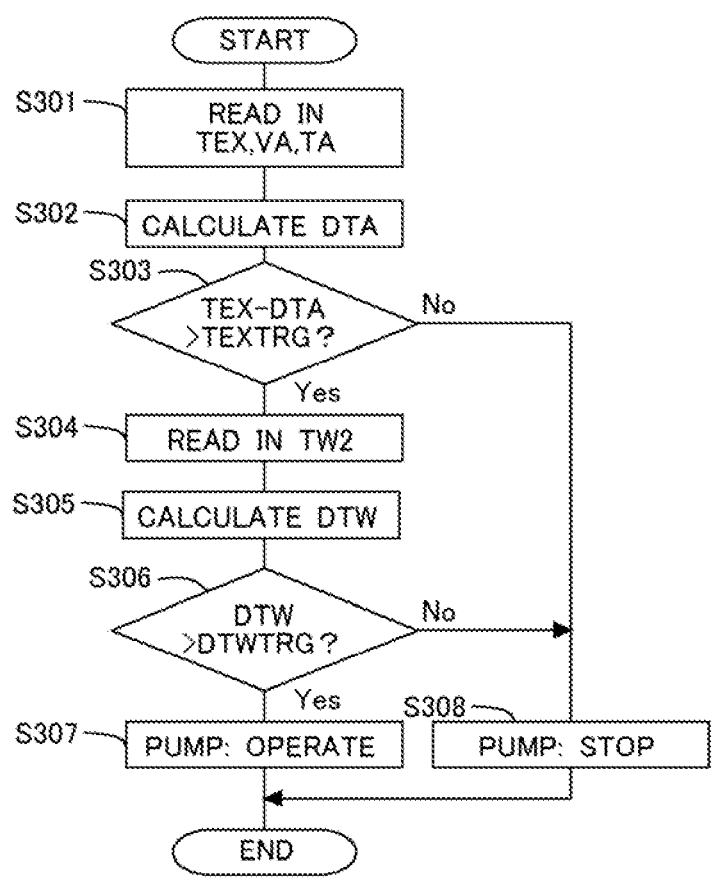
FIG. 7 is a flow chart illustrating a flow of operation control of a pump according to the third embodiment of the present disclosure.

FIG. 7 is a flow chart illustrating a flow or routine for the operation control of the pump 63. The operation control of the pump 63 is carried out by means of the ECU 10 in a repeated manner at each predetermined time interval. In steps from S301 to S303, the same processings as those in the above-mentioned steps from S101 to S103 in FIG. 3 are carried out. Here, note that in cases where a negative determination is made in step S303, the routine advances to step S308, in which the pump 63 is stopped. With this, the cooling water stops circulating through the second heat exchanger 4. At this time, the exhaust gas temperature can be decreased to a sufficient extent only by means of the first heat exchanger 3, so it is not necessary to operate the pump 63. Then, by stopping the pump 63, the load of the pump 63 can be reduced, thus making it possible to reduce the fuel consumption of the internal combustion engine 1. On the other hand, in cases where an affirmative determination is made in step S303, the routine advances to step S304.

In step S304, a temperature TW2 of the cooling water is read in. The cooling water temperature TW2 is detected by the cooling water temperature sensor 64. In step S305, the amount of decrease DTW of the exhaust gas temperature in the second heat exchanger 4 is calculated. The amount of decrease DTW of the exhaust gas temperature in the second heat exchanger 4 is in correlation with the cooling water temperature TW2, etc., so this relation has been obtained in advance through experiments, simulations or the like, and made into a map. In addition, the amount of decrease DTW of the exhaust gas temperature in the second heat exchanger 4 can also be obtained by using a physical model or the like based on the specifications of the second heat exchanger 4, a difference between the cooling water temperature TW2 and the exhaust gas temperature (TEX−DTA), etc. Here, note that the amount of decrease DTW of the exhaust gas temperature in the second heat exchanger 4 may be calculated by a well-known method.

In step S306, it is determined whether the amount of decrease DTW of the exhaust gas temperature in the second heat exchanger 4 is larger than the target amount of decrease DTWTRG. The target amount of decrease DTWTRG is an upper limit value of the amount of decrease in the temperature of the exhaust gas at which the amount of carbon dioxide discharged into the atmosphere becomes larger in the case where the cooling water is circulated through the second heat exchanger 4 than in the case where it is not circulated. The target amount of decrease DTWTRG is an example of the second threshold value. When the amount of decrease DTW of the exhaust gas temperature in the second heat exchanger 4 is equal to or less than the target amount of decrease DTWTRG, it will be determined that a demerit due to an increase in carbon dioxide discharged into the atmosphere is larger than a merit due to a decrease in the exhaust gas temperature in the second heat exchanger 4. Accordingly, in cases where a negative determination is made in step S306, the routine advances to step S308, in which the pump 63 is stopped. As a result of this, the cooling water comes to stop circulating through the second heat exchanger 4, so the load of the pump 43 can be reduced, thus making it possible to reduce the fuel consumption of the internal combustion engine 1. On the other hand, in cases where an affirmative determination is made in step S306, the routine advances to step S307. In step S307, the pump 63 is operated. With this, the cooling water is circulated through the second heat exchanger 4, so the exhaust gas temperature can be decreased in the second heat exchanger 4.

In this manner, by carrying out the operation control of the pump 63, the temperature of the exhaust gas flowing into the carbon dioxide separator 5 can be decreased to a sufficient extent, thus making it possible to enhance the separation efficiency of carbon dioxide in the carbon dioxide separator 5. In addition, in cases where it is not necessary to decrease the exhaust gas temperature by the second heat exchanger 4, or in cases where the amount of discharge of carbon dioxide into the atmosphere will increase when the exhaust gas temperature is decreased by the second heat exchanger 4, the pump 63 is stopped, and hence, the fuel consumption of the internal combustion engine 1 can be reduced, and the amount of discharge of carbon dioxide into the exhaust gas can be reduced. Moreover, the cooling water passage 62 can be made short, by providing the second cooling water circulation system 600 for circulating the cooling water through the second heat exchanger 4 separately from the first cooling water circulation system 400 for cooling the internal combustion engine 1. Accordingly, an increase in cost can be suppressed, and an increase in the load of the pump 63 can also be suppressed. Further, the cooling water of a temperature lower than that of the cooling water of the internal combustion engine 1 can be circulated through the second cooling water circulation system 600, so that the exhaust gas temperature in the second heat exchanger 4 can be further decreased. As a result, the separation efficiency of carbon dioxide can be further enhanced. Here, note that, as explained in the second embodiment, the second heat exchanger 4 can also be arranged in the exhaust passage 2 at the upstream side of the first heat exchanger 3.

What is claimed is:

1. An exhaust gas purification apparatus for an internal combustion engine comprising:
    a first heat exchanger arranged in an exhaust passage of the internal combustion engine, and configured to carry out heat exchange between outside air and exhaust gas of the internal combustion engine;
    a second heat exchanger arranged in the exhaust passage, and configured to carry out heat exchange between a circulating heating medium and the exhaust gas;
    a carbon dioxide separator arranged in the exhaust passage at the downstream side of the first heat exchanger and the second heat exchanger, and configured to separate carbon dioxide from the exhaust gas;

a circulator configured to circulate the heating medium in the second heat exchanger; and
a controller configured to control the circulator,
wherein the second heat exchanger is arranged in the exhaust passage at the downstream side of the first heat exchanger, and
the controller does not circulate the heating medium through the second heat exchanger, in cases where a first exhaust gas temperature, which is the temperature of the exhaust gas after the exhaust gas and the outside air carry out heat exchange in the first heat exchanger, is equal to or less than a first threshold value.

2. The exhaust gas purification apparatus for an internal combustion engine as set forth in claim 1, wherein the heating medium is cooling water of the internal combustion engine.

3. The exhaust gas purification apparatus for an internal combustion engine as set forth in claim 1, wherein in cases where the first exhaust gas temperature is higher than the first threshold value, the controller circulates the heating medium through the second heat exchanger in cases where a second amount of decrease, which is an amount of decrease in the temperature of the exhaust gas by the second heat exchanger at the time when the heating medium circulates through the second heat exchanger, is larger than a second threshold value, whereas the controller does not circulate the heating medium through the second heat exchanger in cases where the second amount of decrease is equal to or less than the second threshold value.

4. An exhaust gas purification apparatus for an internal combustion engine comprising:
a first heat exchanger arranged in an exhaust passage of the internal combustion engine, and configured to carry out heat exchange between outside air and exhaust gas of the internal combustion engine;
a second heat exchanger arranged in the exhaust passage, and configured to carry out heat exchange between a circulating heating medium and the exhaust gas;
a carbon dioxide separator arranged in the exhaust passage at the downstream side of the first heat exchanger and the second heat exchanger, and configured to separate carbon dioxide from the exhaust gas;
a circulator configured to circulate the heating medium in the second heat exchanger; and
a controller configured to control the circulator,
wherein the second heat exchanger is arranged in the exhaust passage at the upstream side of the first heat exchanger, and
the controller does not circulate the heating medium through the second heat exchanger, in cases where a first exhaust gas temperature, which is the temperature of the exhaust gas after the exhaust gas and the outside air carry out heat exchange in the first heat exchanger and which is the temperature of the exhaust gas at the time when the heating medium is not circulated through the second heat exchanger, is equal to or less than a first threshold value.

5. The exhaust gas purification apparatus for an internal combustion engine as set forth in claim 4, wherein the heating medium is cooling water of the internal combustion engine.

6. An exhaust gas purification apparatus for an internal combustion engine comprising:
a first heat exchanger arranged in an exhaust passage of the internal combustion engine, and configured to carry out heat exchange between outside air and exhaust gas of the internal combustion engine;
a second heat exchanger arranged in the exhaust passage, and configured to carry out heat exchange between a circulating heating medium and the exhaust gas;
a carbon dioxide separator arranged in the exhaust passage at the downstream side of the first heat exchanger and the second heat exchanger, and configured to separate carbon dioxide from the exhaust gas;
a circulator configured to circulate the heating medium in the second heat exchanger; and
a controller configured to control the circulator,
wherein the controller does not circulate the heating medium through the second heat exchanger, in cases where a second amount of decrease, which is an amount of decrease in the temperature of the exhaust gas by the second heat exchanger at the time when the heating medium circulates through the second heat exchanger, is equal to or less than the second threshold value.

7. The exhaust gas purification apparatus for an internal combustion engine as set forth in claim 6, wherein the second heat exchanger is arranged in the exhaust passage at the downstream side of the first heat exchanger, and
in cases where the second amount of decrease is larger than the second threshold value, the controller circulates the heating medium through the second heat exchanger in cases where the first exhaust gas temperature, which is the temperature of the exhaust gas after the exhaust gas and the outside air carry out heat exchange in the first heat exchanger, is higher than the first threshold value, whereas the controller does not circulate the heating medium through the second heat exchanger in cases where the first exhaust gas temperature is equal to or less than the first threshold value.

8. The exhaust gas purification apparatus for an internal combustion engine as set forth in claim 6, wherein the second heat exchanger is arranged in the exhaust passage at the upstream side of the first heat exchanger, and
in cases where the second amount of decrease is larger than the second threshold value, the controller circulates the heating medium through the second heat exchanger in cases where the first exhaust gas temperature, which is the temperature of the exhaust gas after the exhaust gas and the outside air carry out heat exchange in the first heat exchanger and which is the temperature of the exhaust gas at the time when the heating medium does not circulate through the second heat exchanger, is higher than the first threshold value, whereas the controller does not circulate the heating medium through the second heat exchanger in cases where the first exhaust gas temperature is equal to or less than the first threshold value.

9. The exhaust gas purification apparatus for an internal combustion engine as set forth in claim 6, wherein the heating medium is cooling water of the internal combustion engine.

* * * * *